(12) United States Patent
Furukawa et al.

(10) Patent No.: US 7,303,351 B2
(45) Date of Patent: Dec. 4, 2007

(54) WRITING INSTRUMENT AND WELDING METHOD OF WRITING POINT ASSEMBLY AND WRITING INSTRUMENT PARTS CONNECTING STRUCTURE AND CONNECTING METHOD

(75) Inventors: Kazuhiko Furukawa, Kouza-gun (JP); Kiyoshi Fujisawa, Takasaki (JP); Yoshihide Ishii, Yokohama (JP); Daisen Kato, Kamakura (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 349 days.

(21) Appl. No.: 10/502,714

(22) PCT Filed: Jan. 30, 2003

(86) PCT No.: PCT/JP03/00929

§ 371 (c)(1),
(2), (4) Date: Jul. 29, 2004

(87) PCT Pub. No.: WO03/064175

PCT Pub. Date: Aug. 7, 2003

(65) Prior Publication Data
US 2005/0074274 A1    Apr. 7, 2005

(30) Foreign Application Priority Data
Jan. 30, 2002  (JP) .............................. 2002-021793
Jan. 30, 2002  (JP) .............................. 2002-021794

(51) Int. Cl.
*B43K 5/00* (2006.01)
*B43K 5/02* (2006.01)
*B43K 7/00* (2006.01)
*B32B 31/00* (2006.01)

(52) U.S. Cl. ...................... 401/251; 401/222; 401/209; 156/272.2; 156/272.4

(58) Field of Classification Search ................ 401/290, 401/221, 222, 249, 251, 209; 156/272.2, 156/272.4, 274.4, 274.6, 275.1
See application file for complete search history.

(56) References Cited

U.S. PATENT DOCUMENTS 2,899,931 A * 8/1959 Bross .......................... 401/111

(Continued)

FOREIGN PATENT DOCUMENTS

JP          40-21434         9/1965

(Continued)

OTHER PUBLICATIONS

English translation of International Preliminary Examination Report dated Feb. 25, 2004 in Application No. PCT/JP2003/000929.

(Continued)

*Primary Examiner*—David J. Walczak
(74) *Attorney, Agent, or Firm*—Buchanan Ingersoll & Rooney PC

(57) ABSTRACT

A writing point assembly and an ink tube and/or a holder can be welded appropriately at a predetermined area without using ultrasonic waves, so as to be able to prevent dislodging of the writing point assembly, ink leakage and the like. The rear end part, of a metallic writing point assembly as a part of a writing instrument, is inserted into a joint, and is heated at the predetermined area (at least the fitted area in contact with the front end part of the joint), so as to weld the predetermined area of the writing point assembly to the surrounding part of the joint.

3 Claims, 6 Drawing Sheets

U.S. PATENT DOCUMENTS

| | | | |
|---|---|---|---|
| 3,997,273 A | | 12/1976 | Germann |
| 4,003,665 A | * | 1/1977 | Dreyer et al. ............... 401/259 |
| 4,472,462 A | | 9/1984 | Apice et al. |
| 4,836,691 A | * | 6/1989 | Suzuki et al. ................. 383/80 |
| 5,004,365 A | * | 4/1991 | Felgentreu ................. 401/258 |
| 6,361,234 B1 | * | 3/2002 | Rukan et al. ............... 401/180 |

FOREIGN PATENT DOCUMENTS

| | | |
|---|---|---|
| JP | 50-122325 A | 9/1975 |
| JP | 138120/1975 | 11/1975 |
| JP | 149138/1975 | 12/1975 |
| JP | 52-43133 B2 | 10/1977 |
| JP | 54-16254 B2 | 6/1979 |
| JP | 56-38379 B2 | 9/1981 |
| JP | 5-84829 A | 4/1993 |
| JP | 7-329484 A | 12/1995 |

OTHER PUBLICATIONS

English translation of JP 50-149138, published Dec. 11, 1975, Inventor: Teiichi Nishimura, Title: Writing Instrument, Applicant: K. K. Sakura Kurepasu.

English translation of JP 50-138120, published Nov. 13, 1975, Inventor: Teiichi Nishimura, Title: Writing Instrument, Applicant: K. K. Sakura Kurepasu.

English translation of JP 54-16254, published Jun. 21, 1979, Inventor: Kazuo Ishizuka; Title: Fitting Method of Writing Point Assembly for Writing Instrument and Writing Point Assembly, Applicant: Mitsubishi Pencil K.K.

Patent Abstracts of Japan, Publication No. 07-329484, published Dec. 19, 1995, Inventor: Nobuo Sekine, Title: Ballpoint Pen, Applicant: Pilot Ink Co. Ltd.

* cited by examiner

WRITING INSTRUMENT AND WELDING METHOD OF WRITING POINT ASSEMBLY AND WRITING INSTRUMENT PARTS CONNECTING STRUCTURE AND CONNECTING METHOD

TECHNICAL FIELD

The present invention is directed to welding of a writing point assembly for a writing instrument, and in particular relates to a writing instrument and a welding method for a writing point assembly as well as a writing instrument parts connecting structure and connecting method, for prevention against gas leakage of a pressurized ball-point pen and breakage of a writing point assembly from press-fitting.

BACKGROUND ART

There are various types of writing instruments such as fountain pens, mechanical pencils and others. Ball-point pens are one of these. Of the ball-point pens, pressurized ball-point pens which are filled up with pressurized gas are known, which have a structure, as disclosed in U.S. Pat. No. 4,472,462 or U.S. Pat. No. 3,997,273, including a joint as a holder for joining the rear end of a writing point assembly as a writing part and the open front part of an ink tube and an inner barrel fitted to the joint by bonding, tight fitting or other methods, wherein the inner barrel is filled up with a pressurized gas such as air, nitrogen gas or the like.

In such pressurized ball-point pens, mere press fitting of the point assembly into the joint or ink tube poses the risk of dislodging the writing assembly due to sealed gas pressure, ambient temperature influences or creep with passage of time. There is also a gas leakage problem occurring due to micro damages during assembly or other reasons. Similarly, even in the case of ordinary writing instruments other than the pressurized ball-point pens, there are cases where the resin joint or ink tube may crack when the point assembly with a writing part is press fitted so that ink will not leak out.

In order to solve these problems, conventionally a flexible resin that is inferior in the other characteristics, has been used, or a method of forming an annular groove in the writing point assembly at the part to be inserted into the ink tube has been adopted. Alternatively, a special shape may be formed so that molten resin by the effect of ultrasonic waves is flowed into annular grooves etc. Also, the holder may be welded by ultrasonic heating to the front end of the barrel to which the writing point assembly is fitted, so that the writing point assembly is fixed by a joint that that externally fits on the writing point assembly.

However, when ultrasonic waves are used for welding, the writing point assembly is affected by ultrasonic waves, possibly causing damage to the writing part and inducing problems such as dislodging of the ball from the tip of the writing point assembly, ink blotting or ink flushing, or splitting during writing. Further, it is impossible to maintain the initial strength of the writing point assembly at the part that is inserted into the ink tube, due to external force, influence from ambient temperature, creep deformation and cracks and others of the material itself. As a result, there occur problems such as dislodging of the writing point assembly, ink leakage, self-heating of the entire writing instrument, instability of welding and the like.

Further, in the conventional writing instruments, since the inner barrel is merely fitted to the joint, there is a risk of the pressurized gas leaking out if the joint is not fixed fast to the inner barrel. This also becomes a cause that may induce ink leakage and other problems.

In order to solve these problems, forcible press fitting or sealant application may be done for a case of metal. For a case of resin, the joint and the inner barrel may be joined by firm fitting using ultrasonic waves or the like. These methods however need difficult assembly or high cost, and also entails the risk of dislodging of the ball held by the writing point assembly, ink blotting and flushing and other new critical problems occurring.

DISCLOSURE OF INVENTION

The present invention has been devised in view of the above, and it is an object of the present invention to provide a writing instrument and a welding method of a writing point assembly, wherein the writing point assembly and an ink tube or/and a holder can be welded appropriately at only a necessary area without using ultrasonic waves, so as to be able to prevent dislodging of the writing point assembly, ink leakage and the like. It is another object to provide a writing instrument parts connecting structure and connecting method, capable of joining the writing instrument parts, for example, a joint and an inner barrel, firmly to prevent leakage of fluids such as gas, ink and the like.

According to the present invention, in order to achieve the above objects, an instrument comprises: a writing point assembly having a writing part at the front end thereof; and an ink tube for supplying the writing point assembly with ink stored therein, and is characterized in that the writing point assembly formed of metal is fitted into a surrounding holder or/and the ink tube with a predetermined area of the fitted portion brought into close contact therewith and heated so that the resin around the predetermined area of the writing point assembly fuses or softens to weld the writing point assembly to the holder or/and ink tube.

Herein, the heated portion of the writing point assembly may be formed of stainless steel.

Also, a pressurized gas may be sealed in the interior forming a pressurized ball-point pen.

The holder may be formed of a resin presenting a tensile elongation of 20% or less (based on ASTMD638) such as polycarbonate, ABS, cyclic polyolefin, modified polyphenylene ether, polystyrene or the like, and the holder and the writing point assembly may be welded.

The present invention is a welding method wherein only the rear end part of the writing point assembly is heated without heating the front end part of the writing point assembly.

The present invention is a welding method wherein the predetermined area of the writing point assembly made of metal is induction heated with an electromagnetic induction coil.

The present invention is a welding method wherein the rear end of the writing point assembly is welded by heating with a heated trowel.

Herein, for heating induction heating using an electromagnetic coil may be chosen.

Also, the rear end part of the writing point assembly is welded by heating with a heated trowel.

The present invention is a structure for connecting parts of a writing instrument, and is characterized in that each part is formed of resin, and a conductor is arranged between the parts and brought into close contact with the parts and welded by heating.

The present invention is a writing instrument parts connecting structure for connecting parts of a writing instrument, and is characterized in that the joint and cylindrical element are formed of resin, a conductor is provided in close contact between the joint and the cylindrical element, and the conductor, joint and cylindrical element put in close contact are welded.

Herein, the joint may be interposed between the point assembly and the ink tube of the writing instrument so as to join these elements and the cylindrical element may be made to serve as an inner barrel of the writing instrument so as to cover the ink tube.

It is preferred that the conductor is in the form of a stainless steel ring.

It is also preferred that the conductor may be heated and welded using electromagnetic induction heating.

Further, the present invention is a writing instrument parts connecting method for connecting parts of a writing instrument, comprising the steps of: molding each part from resin; arranging a conductor between the parts; and heating the conductor by electromagnetic induction after setting the parts into close contact with the conductor, so as to weld the parts to the conductor.

Moreover, the present invention is a parts connecting method for connecting a joint and a cylindrical element, both made of resin, comprising the steps of: arranging an annular conductor between the joint and the cylindrical element; and heating the conductor by electromagnetic induction after setting the conductor into close contact with the joint and cylindrical element, so as to weld the joint and the cylindrical element.

It is preferred that the conductor is given in the form of a stainless steel ring.

Herein, the parts of a writing instrument at least include a joint and a cylinder element. Other than these, a tail plug and a cylindrical element, a point assembly and a joint, and a point assembly and an ink tube are included for example. However, these are mere examples and the parts are not particularly limited. The parts of the writing instrument may be transparent, translucent or opaque. As the conductor, those in a ring form are used mainly. However, a barrel-like cylinder may be used. A plurality of magnetic pieces may be applied to the outer peripheral surface of the joint. Application of a magnetic paint, a spring, plating, etc. may be made use of. Further, the parts connecting structure and connecting method are mainly used for writing instruments, however, they can also be applied appropriately to a relatively inexpensive articles that demand similar leakage resistance or aesthetic appearance, such as cosmetic products that handle various liquids and gases.

According to the present invention, as the parts such as a joint and a cylindrical element are heated so as to be welded (fused to join), a strong connecting force can be obtained, whereby it is possible to effectively prevent leakage of pressurized gas and leakage of ink.

Further, when a conductor as an object to be heated is induction heated by application of an electromagnetic field, electric energy is transferred to (electric current is induced within) the conductor, the conductor itself converts the electric current into Joule heat. With this conversion to Joule heat, in other words, eddy current loss, the joint and the cylindrical element, both made of resin, become welded at their opposing faces.

When stainless steel is used for the conductor, thermal generation improves from the magnitude of the current resistance to eddy current improves and rust resistance and thermal degradation improve as well. Further, when the conductor is given in a ring form, weldability and eddy current efficiency also improve.

BEST MODE FOR CARRYING OUT THE INVENTION

Figure 1:
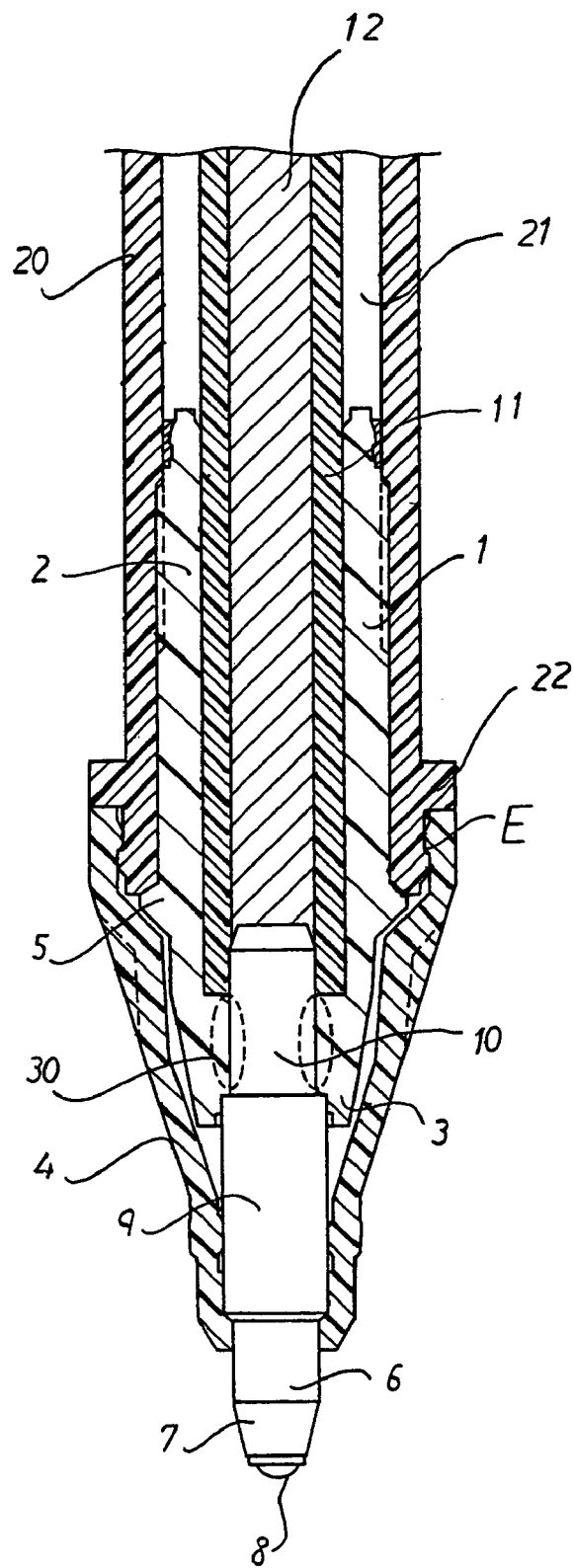
FIG. 1 is a partial illustrative view showing a pressurized writing instrument in the first embodiment of a writing instrument and a welding method of a writing point assembly according to the present invention.
Figure 2:
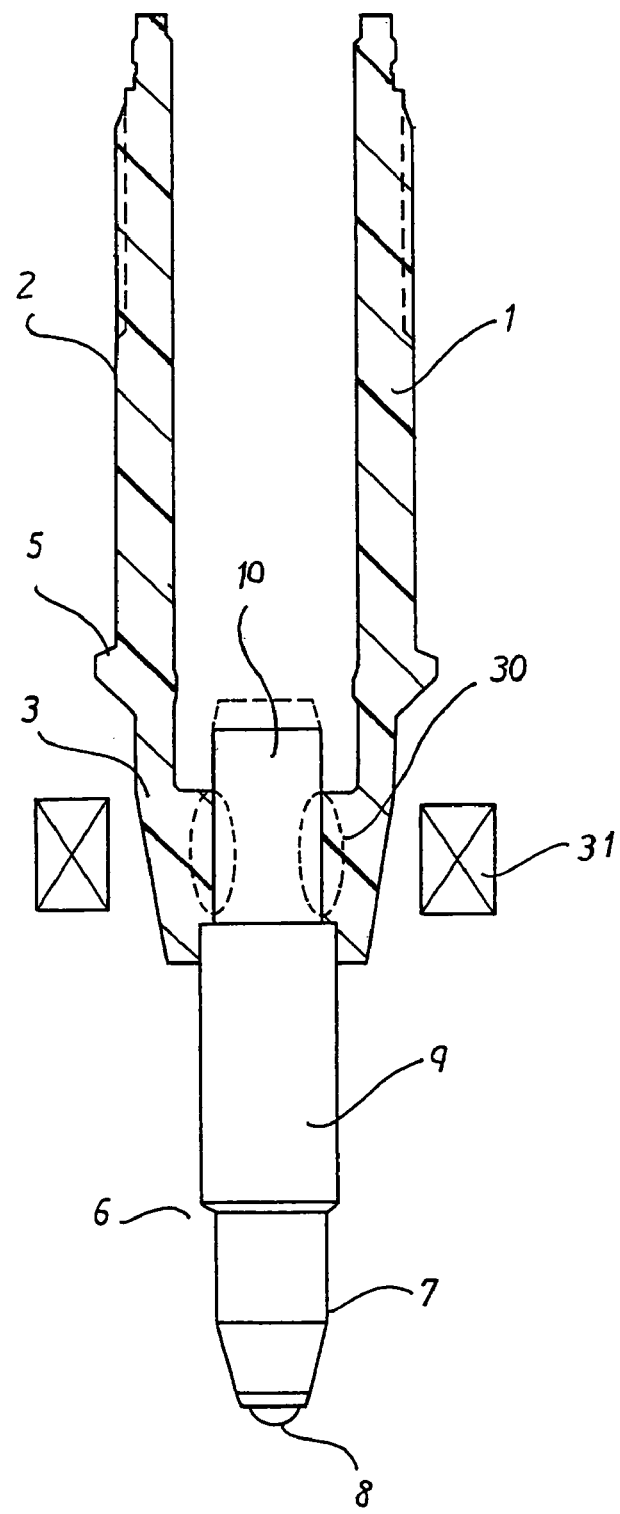
FIG. 2 is an illustrative view showing a state where the writing point assembly in the first embodiment is fitted to a joint and welded thereto.
Figure 3:
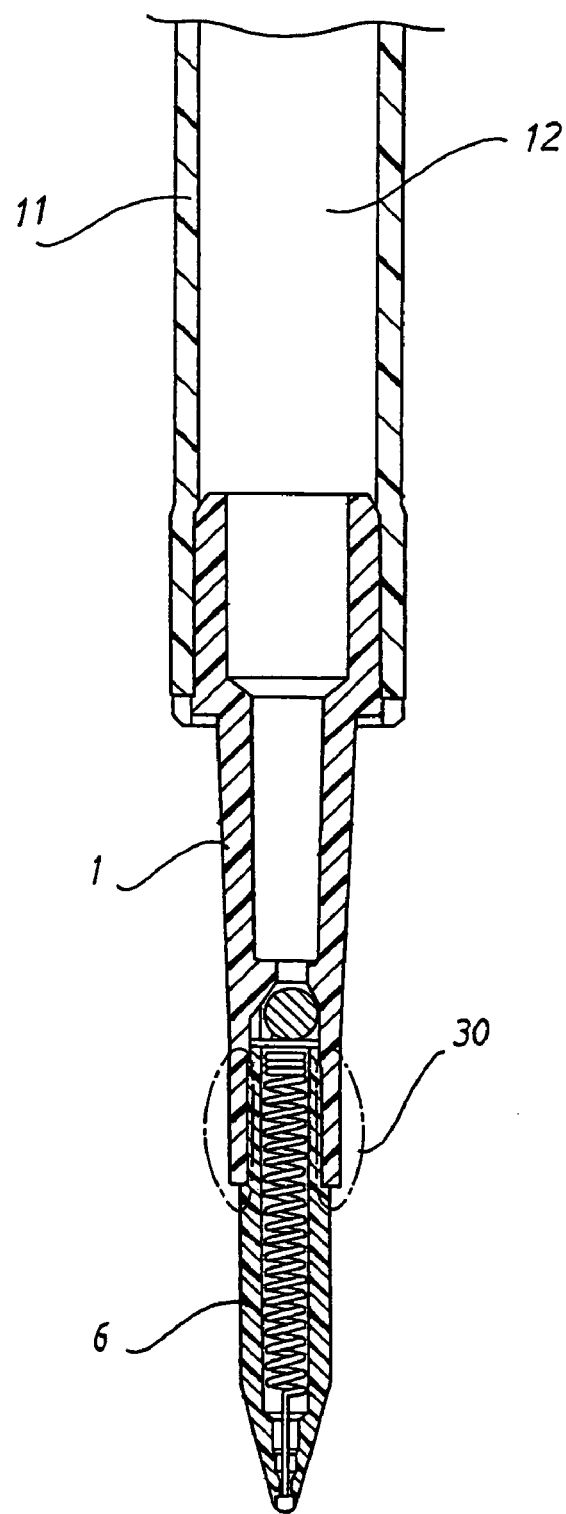
FIG. 3 is a partial illustrative view showing a gel ball-point pen in the second embodiment of the present invention.

A preferred embodiment of a writing instrument and a method of welding a writing point assembly according to the present invention will hereinbelow described with reference to the drawings. FIG. 1 is an illustrative vertical sectional view partially showing the front end of a pressurized ball-point pen refill according to the first embodiment of a writing instrument and a welding method of a writing point assembly. FIG. 2 is an illustrative view showing a state of the writing point assembly and a joint being fitted and fixed in FIG. 1. FIG. 3 is an illustrative vertical sectional view showing the front end part of a gel ink ball-point pen. Here, illustration of the barrel cylinder covering the refill is omitted.

In the writing instrument in the first embodiment of the present invention, as shown in FIG. 1, a rear end part 10, of a writing point assembly 6 formed of metal and externally covered by a joint 1 as a holder made of resin, is inserted into the opening at the front end part of a resin ink tube 11.

Fitted externally on outer peripheral surface of joint 1 is an inner barrel 20 that is closed at the rear end thereof. A point assembly holder (so-called plastic mouthpiece) 4 for protecting writing point assembly 6 is fitted from the front end part of the inner barrel 20 to the mid part 9 of writing point assembly 6. Writing point assembly 6 supports a ball 8 at a front end part 7 as a writing part in a rotatable manner. The outer peripheral part of mid part 9 is formed to be greater in diameter than the front end part 7 and rear end part 10. Ink tube 11 is a hollow cylinder and stores ink 12 therein. This ink tube 11 is firmly fixed to writing point assembly 6 or/and joint 1, by fitting, bonding, welding or other methods, so that ink 12 will not come out.

Joint 1 is formed in a slightly tapered, approximately cylindrical structure, and a step is formed inside the bore at the central portion, forming a small-bore portion, narrower than the rear portion. Specifically, inserted into a large-bore portion 2, from the central portion to the rear along the axis of the joint 1, having a greater inside diameter is the open front end of ink tube 11. The front end part 3 with its inner periphery stepped to be narrower externally fits on part of rear end part 10 of writing point assembly 6. This front end part 3 is stepped to be large in diameter at the frontmost end, so as to allow the stepped portion at the rear of the mid portion 9 of writing point assembly 6 to be inserted therein.

As shown in FIG. 1, an annular flange 5 is formed on the outer periphery at a position closer to the front of large-bore portion 2 of joint 1, so that inner barrel 20 that externally fits on joint 1 is fitted and positioned until it abuts this flange 5. Further, an annular positioning flange 22 is formed on the external periphery of inner barrel 20.

Point assembly holder 4 has an overall shape that forms an approximately conical side. The inner periphery at its front end abuts the outer peripheral surface of mid portion 9 of writing point assembly 6 so as to provide an anti-falling function while the rear end abuts positioning flange 22 of inner barrel 20 and the inner periphery fits the outer periphery of inner barrel 20 (at the fitting portion indicated by a code E). Thus, the holder can be fixed by fitting of the outer periphery of joint 1 and the inner periphery of inner barrel 20.

The aforementioned writing point assembly 6 is connected to ink tube 11 via joint 1 while pressurized gas 21 is tightly sealed inside inner barrel 20, thus forming a pressurized writing instrument.

Concerning the material for each of the aforementioned components, in consideration of gas barrier performance, polypropylene or polyethylene can be used for ink tube 11 and ethylene-vinyl copolymer (EVOH), PET, nylon, PBT, POM, polyacrylonitrile, PEN, etc., can be used for joint 1 and inner barrel 20.

In this arrangement, the rear end part 10 inserted into joint 1 of writing point assembly 6 is heated at the predetermined area (at least the fitted area in contact with the front end part 3 of joint 1) 30, so as to fuse the resin at the predetermined area 30 and thereabout, thereby welding the predetermined area 30 of writing point assembly 6 and the surrounding joint 1. In this case, since the front end part 7 of writing point assembly 6 is not heated but only the rear end part 10 is heated, it is possible to prevent adverse effects such as discoloration, deformation, degradation, etc., due to heating of unnecessary part.

The heating is preferably done by electromagnetic induction heating at the predetermined area 30 of writing point assembly 6. This is because use of induction heating makes possible heating of the target area only without causing any defect such as dislodging of the ball, degradation of ink 12, flushing, welding failure, unnecessary heating of the whole part, etc., which would occur from vibrations when ultrasonic heating is used. Further, as shown in FIG. 2, an induction coil 31 is disposed so as to be spaced from and directed to the predetermined area 30 of writing point assembly 6. Application of electric current through this induction coil 31 generates induction current in the predetermined area 30 of writing point assembly 6 so that only the predetermined area 30 can be heated.

The present invention, however, should not be limited to this. The rear end of writing point assembly 6 may be heated with a heated trowel. The writing point assembly 6 may be formed of any of various kinds of metals as long as the metal can be heated by induction heating. In particular, stainless steel is preferred which contains ferromagnetic components such as Fe (iron), Cr (chromium) etc., in greater amounts and will not rust or be oxidized by heating. Other material can be used for other than the heated portion if at least the predetermined area 30 or the portion to be heated is formed of stainless steel. In this case, the range of material selection can be widened so that cost reduction can be expected.

The above writing instrument is effective when applied to a pressurized ball-point pen in which the inner barrel 20 is formed to be a hermetic space and pressurized gas 21 such as pressurized air, nitrogen gas or the like is charged within the interior space. This is because the above welding method enables the predetermined area 30 to form an air-tight hermetic structure simply and reliably. In addition, the welding is actually effective in preventing gas leakage due to vertical scratches formed during assembly.

In the above embodiment, writing point assembly 6 is welded to joint 1, but writing point assembly 6 may be welded to ink tube 11, solo or in combination with the above welding. This produces tight and reliable adhesion between writing point assembly 6 and ink tube 11, hence producing preferable result in view of leakage of ink 12.

Next, FIG. 3 is a partial illustrative view showing a gel ink ball-point pen in the second embodiment of the present invention.

The differences from the first embodiment are that the writing instrument is of a non-pressurized type and that joint 1 is formed of a material such as ABS, modified polyphenylene ether (modified PPE), cyclic polyolefin, polycarbonate (PC), polystyrene (PS) or the like, which is prone to crack by press fitting and which is a resin having a tensile elongation of 20% or less based on ASTMD638 and being easy to crack because of lower stretchability. Even with such resin, generation of cracks and falling of the point assembly can be prevented by heat-welding.

With the heat welding of the present invention, even polystyrene, which is vitreous and prone to crack, can be used to achieve ink 12 or gas leakage free welding if the press fit margin is set to be very small or almost none or even if there is a gap without any press fit margin.

Also, though there are differences in the shapes of ink tube 11 and the point assembly press fit portion of joint 1, the present invention is applicable in the same manner. Further, the present invention can be applicable in the same manner to various types of writing tips such as those for fountain pens, maker pens, pipe pens, etc.

Next, a preferred embodiment of writing instrument parts connecting structure and connecting method according to the present invention will be described. In the writing instrument of this embodiment, as shown in FIGS. 4 to 7, a joint 1 and an inner barrel 20 given in a cylindrical form, both constituting a pressurized ball-point pen, are separately formed of resin. A conductive ring 40 which opposes, and comes into contact with, the inner peripheral surface of inner barrel 20 is fitted on the outer peripheral surface at the terminal end of joint 1. This conductive ring 40 is heated by induction (called electromagnetic induction heating (IH: induction heating)) so as to weld joint 1 and inner barrel 20 in an appropriate manner.

Figure 4:
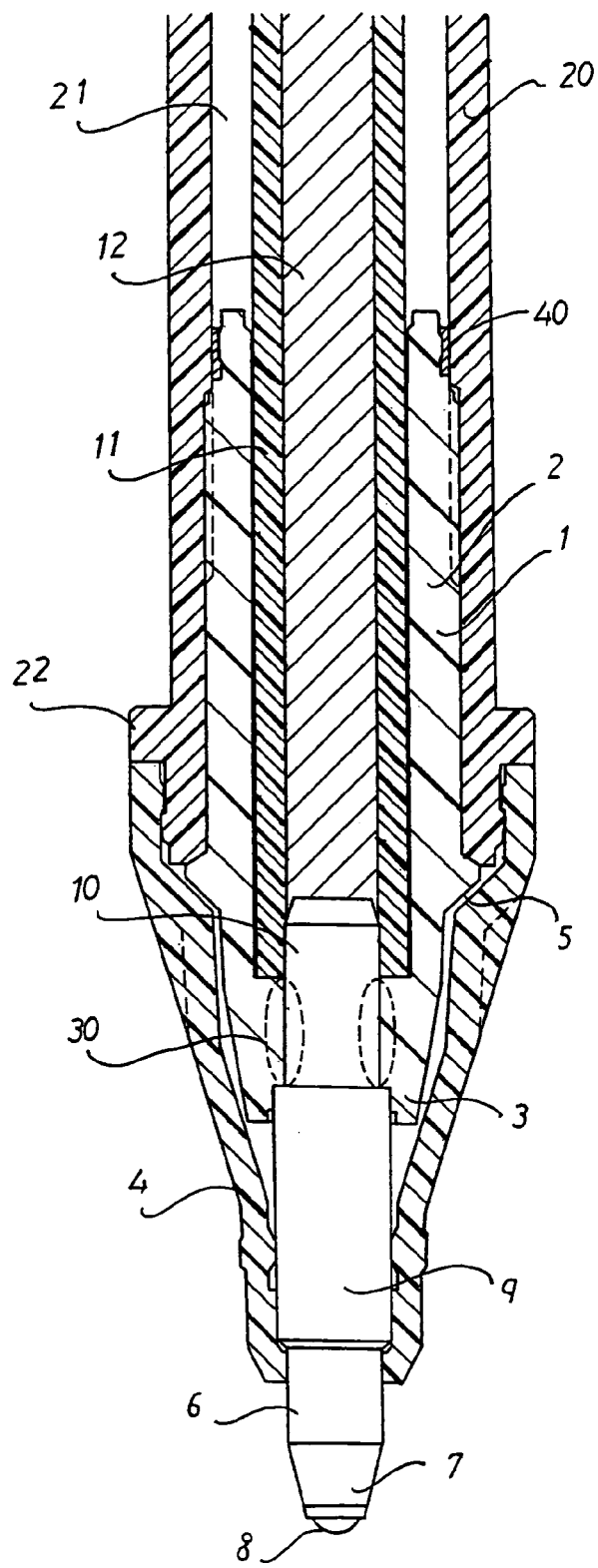
FIG. 4 is a sectional illustrative view showing an embodiment of a writing instrument parts connecting structure according to the present invention.
Figure 5:
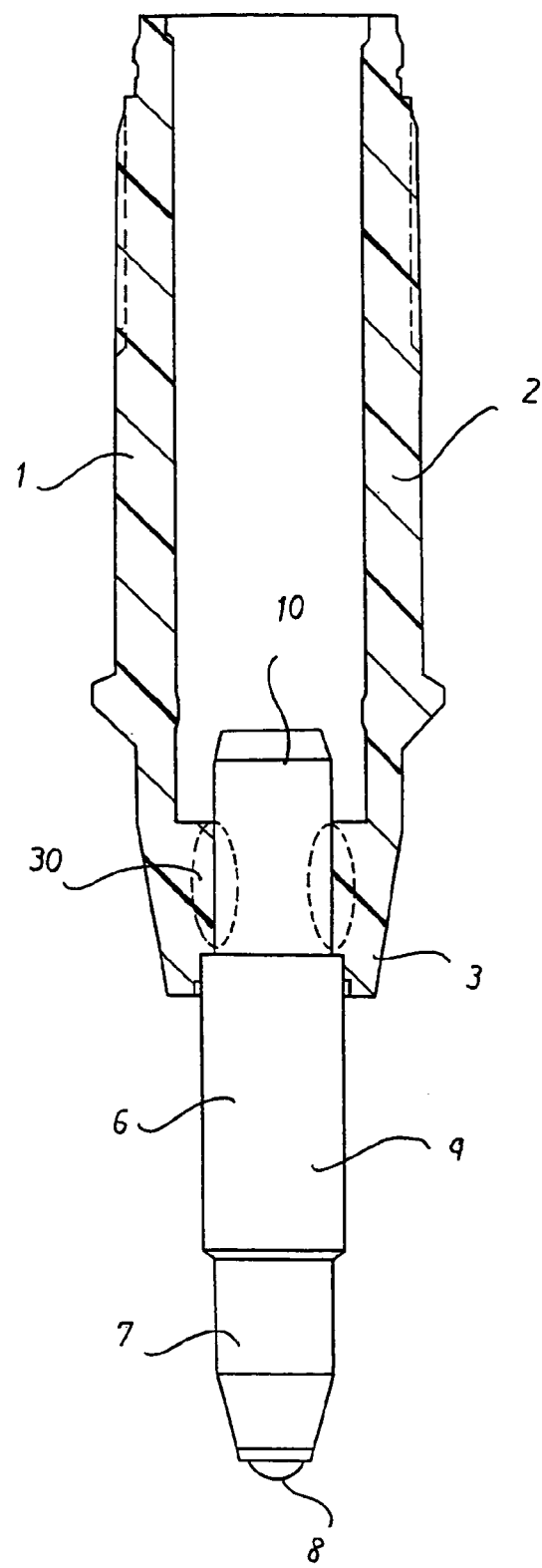
FIG. 5 is a sectional illustrative view showing a joint and a writing point assembly in the embodiment of a writing instrument parts connecting structure according to the present invention.

Joint 1 is formed by injection molding using a predetermined resin, specifically, ABS, PP, PS, PE, recycled plastics, etc., which is excellent in impact resistance, mechanical properties and the like, or a material also considering gas barrier performance, such as EVOH, PET, nylon, PBT, PA, POM, etc., for pressurized pens, and functions to protectively connect the rear end part 10 of a metallic writing point assembly 6 and the front end of an elongate ink tube 11. This joint 1, as shown in FIGS. 4 and 5, is formed basically in a cylindrical shape having an approximately nozzle-like form at the front end part 3. The bore in this front end part is formed to be smaller in diameter than that of the other part of the front end part 3. A point assembly holder (also called plastic mouthpiece) 4 having an approximate cap-like section is tightly fitted on the front end part 3. An annular flange 5 is projected radially outwards from the outer peripheral surface at the approximate center of joint 1. This flange 5 abuts the opening front end of inner barrel 20.

Writing point assembly 6 is formed of, for example, stainless steel, or the like, which is excellent in erosion resistance, corrosion resistance, magnetism, IH heating performance, etc. As shown in FIGS. 4 and 5, this writing point assembly 6 including a rotatable ball 8 at a front end part 7 is formed so that its mid part 9 is formed to be marginally greater in diameter and its rear end part 10 is fitted into the front end part 3 of joint 1 by electromagnetic induction heating, bonding or the like. Ink tube 11 is formed of translucent PP, PET resin, PE, recycled plastics or the like, for example, to be a hollow cylinder by extrusion molding. This ink tube 11 is filled up with ink (black, red, vermilion, blue or any color of ink) 12, and the front end part is inserted into joint 1 from its terminal end while the frontmost end is fitted and connected to the rear end part 10 of writing point assembly 6 by press fitting, welding or any other method.

As shown in FIGS. 4 and 5, inner barrel 20 is formed in an elongate cylindrical form or in a cup-like form, specifically using a predetermined resin such as ABS, PP, PS, PE, recycled plastics, etc., which is excellent in impact resistance, mechanical properties and the like, or using a material also considering gas barrier performance, such as EVOH, PET, nylon, PBT, PA, POM, etc., for pressurized pens. The inner barrel is fitted to the rear end part of joint 1 with its open front end abutted against a flange 5 and hermetically encloses ink tube 11 leaving a space thereto. A pressurized gas 21 such as nitrogen, air or the like is charged in this space, to constitute a pressurized writing instrument. An annular positioning flange 22 is projected radially outwards from the outer periphery in the front end part of inner barrel 20. This positioning flange 22 abuts the open terminal end of holder 4 and is either fitted or welded.

Figure 6:
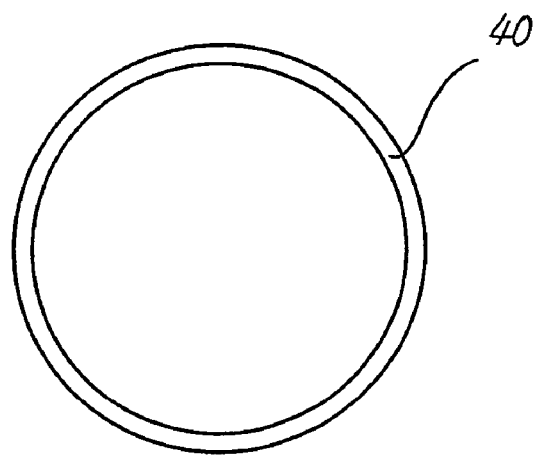
FIG. 6 is a plan view showing a conductive ring in the embodiment of a writing instrument parts connecting structure according to the present invention.
Figure 7:
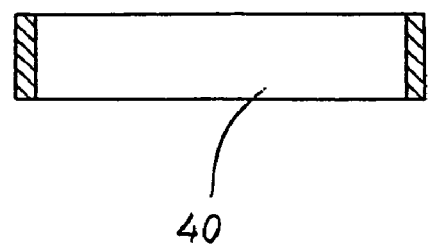
FIG. 7 is a sectional view of FIG. 6.

As shown in FIGS. 6 and 7, conductive ring 40 is formed of, for example, stainless steel which is excellent in erosion resistance, corrosion resistance, magnetism, plated iron or the like. Stainless steels SUS430, SUS304 etc., are preferably used.

Referring to an example of manufacturing a writing instrument of the above configuration, first, conductive ring 40 is fitted and fixed to the outer peripheral surface at the terminal end of joint 1, and joint 1 and writing point assembly 6 are fitted together, forming an assembled writing element. After preparation of the assembled writing element, ink 12 is charged into ink tube 11 and the assembled writing element is inserted to the tube, completing an assembled tube.

Next, the assembled tube is press fitted into inner barrel 20 while pressurized gas 21 is charged therein. Then as electromagnetic induction heating is applied from exterior around conductive ring 40, conductive ring 40 is heated so that joint 1, inner barrel 20 and conductive ring 40 are joined by welding. When joint 1, inner barrel 20 and conductive ring 40 have been welded, electromagnetic induction heating is stopped for cooling and solidification, whereby it is possible to obtain a perfect gas or ink 12 leakage-free structure.

Upon electromagnetic induction heating of conductive ring 40, heating efficiency may and should be enhanced by minimizing the gap between induction coil 31 and conductive ring 40 so that many magnetic fluxes will concentrate on conductive ring 40. Since conductive ring 40 is given in an annular form, the generation efficiency of eddy current can be particularly enhanced upon electromagnetic induction heating, producing preferable result. When conductive ring 40 is formed of stainless steel (e.g., SUS430, SUS 304, etc.), various effects such as improvement of the surface adhesion due to rust resistance; improvement of the generation efficiency of eddy current and excellent heating efficiency due to high electric resistance can be obtained.

According to the above configuration, it is possible to fit and fix joint 1 to inner barrel 20 reliably and tightly by electromagentic induction heating even if, for example, part material that is prone to crack when press fitted hence cannot be forcibly press fitted is used or if small scratches were formed during assembly. Therefore, there is no fear of pressurized gas 21 leaking, hence there is no fear of ink leakage and the like, which would occur as a result of gas leakage. In addition, since electromagnetic induction heating that is characterized by rapid heating and non-contact heating (needing no electrode) is used, unlike the case of ultrasonic joining it is possible to markedly effectively solve the critical problems such as dislodging of ball 8 supported by writing point assembly 6, blotting and flushing of ink 12 and others. Further, unlike the case of ultrasonic joining, work stability as well as improvement of work speed can be expected.

Further, even in a case where a material that cracks with passage of time when it is subjected to normal press fitting, such as PS, AS, PC, cyclic polyolefin, EVOH, or the like is used, it is possible to adhere it in a stress-free state by virtue of heating. Thus, since cracks hardly occur, this permits easy material selection. In addition, since conductive ring 40 is not of a single plate-like form but of a continuous form, welding will not become partly localized on the peripheral surfaces of joint 1 and inner barrel 20, but can be done uniformly and appropriately on the peripheral surfaces of joint 1 and inner barrel 20. Further, according to the induction heating method, high-temperature heating and high-speed control can be expected so that it is possible to improve productivity on the production line (quality, yield, operating rate, flexibility, space, maintenance operating control, etc.). As a result, it is possible to satisfy the demands for appearance, cost, productivity and performance.

In the above embodiment, joint 1 and inner barrel 20 are welded to each other by electromagnetic induction heating of conductive ring 40. However, the present invention should not be limited to this. For example, writing point assembly 6 may be heated by electromagnetic induction so as to weld joint 1 and writing point assembly 6 at the predetermined area (indicated by broken lines in FIGS. 4 and 5) 30, or writing point assembly 6 and ink tube 11 may be welded. In this case, the whole of the writing point assembly may be heated by electromagnetic induction or only the predetermined area 30 of writing point assembly 6, specifically the rear end part 10 may be heated by electromagnetic induction so as to inhibit discoloration and other effects entailed with heating of unnecessary portion. Further, the invention is also applicable to any joint between components similar to writing instruments, such as a barrel and tail plug, a cap and a clip, a plastic mouthpiece and a barrel, and the like.

INDUSTRIAL APPLICABILITY

As has been described, according to the present invention, since the writing point assembly is welded to the holder and/or the ink tube without using ultrasonic waves, the writing point assembly will not be affected by ultrasonic waves, hence dislodging of the ball supported at the front end of the writing point assembly as well as degradation and flush of ink, defects such as splitting during writing and the like can be effectively prevented. Further, it is possible to maintain the initial strength of the fitted portion of the writing point assembly even if it is affected by external force, ambient temperature influences, creep deformation of the material and the like. Thus, dislodging of the point assembly, cracking at the press fitted portion or ink leakage will not occur.

Further, in the present invention, if only the rear end part of the writing point assembly is heated without heating the front end part, it is possible to effectively prevent waste of heating of unnecessary portions, degradation due to heating of areas other the area to be welded, adverse effects on writing due to thermal deformation of the writing part and other harmful effects.

For the aforementioned heating, if the writing point assembly made of metal is induction heated at the predetermined area with an induction coil, it is possible to surely prevent the aforementioned harmful effects caused by ultrasonic heating.

It is also possible to achieve welding in the same manner with a simple configuration if the rear end of the writing point assembly is heated with a heated trowel.

Further, if the heated portion of the writing point assembly is formed of stainless steel (SUS430 is especially preferable), it is possible to achieve reliable and precise bonding in a high efficiency without suffering any degradation if induction heating is done.

In the case where the writing instrument is a pressurized ball-point pen, it is possible to perfectly prevent gas leakage and hence provide stable quality.

Further, even in use of a material that cracks when it is subjected to normal press fitting or a material that presents less elongation, cracks can be effectively prevented by virtue of stress relieving owing to heating.

Moreover, the present invention is effective in firmly connecting the parts of a writing instrument, for example, a joint and an inner barrel to thereby inhibit leakage of fluids such as gas, ink, etc., as well as providing a strong anti-dislodging configuration. Also, even if a material that is prone to crack due to press fitting is used, it is possible to obtain a crack-free joining method because the parts can be fixed with stresses removed.

The invention claimed is:

1. A writing instrument comprising a conductor, a joint, a cylindrical element, a point assembly and an ink tube, wherein the joint and the cylindrical element are formed of resin, the conductor is provided in close contact between the joint and the cylindrical element, the joint and cylindrical element are connected to one another by a weld, the conductor is in contact with the weld and the joint is interposed between the point assembly and the ink tube of the writing instrument so as to join these elements and the cylindrical element is made to serve as an inner barrel of the writing instrument so as to cover the ink tube.

2. The writing instrument according to claim 1, wherein the conductor is in the form of a stainless steel ring.

3. The writing instrument according to claim 1, wherein the conductor is heated and welded using electromagnetic induction heating.

* * * * *